United States Patent [19]

Pease

[11] Patent Number: 5,826,321
[45] Date of Patent: Oct. 27, 1998

[54] COIL INSERTING TOOLING WITH QUICK RELEASE COLLET

[75] Inventor: Timothy K. Pease, Kendallville, Ind.

[73] Assignee: RMT, Inc., Huntertown, Ind.

[21] Appl. No.: 586,585

[22] Filed: Jan. 16, 1996

Related U.S. Application Data

[63] Continuation of Ser. No. 202,762, Feb. 28, 1994, abandoned.

[51] Int. Cl.$^6$ ............................. B23P 17/00; H02K 15/06
[52] U.S. Cl. ............................. 29/426.1; 29/596; 29/734; 29/736
[58] Field of Search .................................. 29/426.1, 596, 29/732, 734, 762, 736

[56] References Cited

U.S. PATENT DOCUMENTS

| | | | |
|---|---|---|---|
| 4,476,625 | 10/1984 | Bricker et al. | 29/734 |
| 4,477,966 | 10/1984 | Naperski | 29/734 X |
| 4,955,130 | 9/1990 | Bricker et al. | 29/734 |
| 5,239,220 | 8/1993 | Taji et al. | 29/732 X |
| 5,537,730 | 7/1996 | Pease | 29/734 X |

FOREIGN PATENT DOCUMENTS

| | | | |
|---|---|---|---|
| 59-99950 | 6/1984 | Japan | 29/732 |

Primary Examiner—S. Thomas Hughes
Attorney, Agent, or Firm—Roger M. Rickert

[57] ABSTRACT

Improvements in coil placing tooling of the type employed to insert prewound coils in the slots of dynamoelectric machine stator cores which tooling has an annular collet for maintaining wedge guides axially and radially in position, and the wedge guides in turn maintain blades radially in position are disclosed. The blades are readily removable and replaceable by releasing the collet for limited displacement relative to the blades, moving the collet to a position where selected wedge guides are freed axially and radially, removing certain of the selected wedge guides, and subsequently removing certain of the blades associated with the removed wedge guides. Improvements in reversible blades for such coil placing tooling are also disclosed. Certain ones of the blades comprise an elongated blade of generally uniform cross-sectional configuration with a transverse support dowel receiving hole near each end. The blade is normally mounted in coil placing tooling by a dowel passing through one of those holes and with the convex surfaces facing radially inwardly toward one another. The blade may be removed from the dowel, reversed end-for-end and replaced in the coil placing tooling with the dowel passing through the transverse hole in the previously free end. In order to reduce damage to the coils, each free end has the convex portion relieved from the center of the hole toward the corresponding end of the blade. Typically about 0.008 to 0.010 is removed from the radially inner convex surface between the holes and the blade tips.

4 Claims, 4 Drawing Sheets

– 1 –
COIL INSERTING TOOLING WITH QUICK RELEASE COLLET

CROSS-REFERENCE TO RELATED APPLICATION

This application is a continuation of application Ser. No. 08/202,762 filed Feb. 28, 1994, now abandoned.

SUMMARY OF THE INVENTION

The present invention relates generally to apparatus for inserting prewound coils into the slots of dynamoelectric machine stator cores and more particularly to improvements in such apparatus which facilitate the repair or replacement of worn or damaged parts and reduce the likelihood of wire damage during the insertion process.

U.S. Pat. No. 2,432,267 to Adamson teaches a slotted cylinder which fits within the bore of a slotted dynamoelectric machine stator core. Coils are placed in the cylinder slots and the cylinder is inserted into a stator core bore. A stripper moves through the cylinder forcing the coils into the stator slots. The apparatus shown in the Hill U.S. Pat. No. 3,324,536 refines this technique by utilizing a plurality of upstanding blades (sometimes called coil side turn feeder blades) rather than an Adamson-type cylinder and by providing a second set of upstanding blades (hereinafter called wedge guides) radially outside the first set of blades for guiding insulating wedges such as phase separating wedges or slot closure wedges from a cylindrical magazine into the stator core along with the side turn portions of the coils. Wedge push rods move with the stripper during at least a portion of its stroke to urge the insulating wedges from the magazine into the stator core. The coil inserter of U.S. Pat. No. 3,689,976 to Donovan further refines these techniques and prevents certain wire sizes from jamming during placement by supporting some (typically alternate ones) of the inner set of blades on the stripper so that those blades move relative to the remaining blades during the insertion process. Coil placing machines of this type, and particularly the tooling for such machines has undergone numerous other refinements since their introduction.

Despite the high degree of refinement and great commercial success, the tooling for such coil placing tooling still suffers from a number of drawbacks. Damage to the wire or to the insulation thereon still occurs all to frequently. Due to any of a number of reasons such as the accumulation of tolerances within the tooling, wear, or improper operation of the tooling, slight misalignments occur. The typical result of such misalignment is damage to one or more of the blades, wedge guides or the insulating wedge push rods.

Bent or otherwise damaged blades or wedge guides typically produce an unacceptable product and generally must be replaced to avoid further damage to the coil placing tooling. U.S. Pat. No. 4,476,625 to Bricker et al discloses a scheme for reducing damage to the wedge push rods by maintaining the engagement between those rods and the cylindrical magazine at all times during operation of the coil placing tooling. In this patented arrangement, there is an annular collet surrounding the wedge guides and radially adjacent blades which must be removed in order to remove either of these blades. Once removed, the entire arrays of wedge guides and blades are unrestrained and reassembly including proper alignment of the wedge guides and blades with the various supporting rings and the stripper is tedious and time consuming.

U.S. Pat. No. 4,955,130 to Bricker et al discloses a technique for the rapid removal and replacement of damaged wedge guides or blades. In this patented arrangement, a removable collet similar to the collet in the previous Bricker et al patent maintains the wedge guides radially inwardly and downwardly so that the base of those wedge guides is forced securely into an annular groove in a base support plate. The wedge guides in turn maintain their corresponding blades radially inwardly onto dowel pins. A space is provided between a portion of the inner surface of the collet and the outer surface of the wedge guides. The collet need only be partially loosened so that a wedge guide may be raised from the annular groove, the just freed end of the wedge guide along with its associated blade pivoted radially outwardly to disconnect the pin from the blade thus freeing the blades for generally axial removal. The wedge guide of this prior art system must be removed first to provide sufficient clearance for removal of the blade. This prior art scheme requires that the stripper be removed to replace a blade, requires a resetting of the so-called stack height adjustment, each time one or more blades is replaced. The concept of stack height (the length of a stator core in the direction of its central bore) adjustment is discussed at length in U.S. Pat. No. 4,156,964.

The last mentioned Bricker et al patent also discloses reversible blades, that is, blades which have a dowel pin receiving hole near each end so that when one blade end is damaged, the blade may be removed, reversed end-for-end and replaced in the tooling for continued service. Wire insulation damage is more prevalent with such reversible blades. The Applicant has discovered that the dowel receiving hole near the free end of such a reversible blade is a contributing factor in damaging wire as it is stripped from the blade into a stator core.

Among the several objects of the present invention may be noted the provision of coil placing tooling which overcomes the drawbacks of the last mentioned patented device; the provision of coil placing tooling which is less likely to damage wire or insulation during coil placement; the provision of coil placing tooling adapted for quickly replacing wedge guides or blades; and the provision of coil placing tooling characterized by reduced wire damage and reduced down-time for repair or maintenance. These as well as other objects and advantageous features of the present invention will be in part apparent and in part pointed out hereinafter.

In general, coil placing tooling having an annular collet for maintaining wedge guides and blades axially and radially in position, has that collet freed for limited rotational motion and the collet is moved angularly relative to the blades to a position where the selected blades are freed axially and radially for ready removal. Each wedge guide maintains a corresponding blade radially inwardly, hence, a wedge guide is first removed in order to free a corresponding blade.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
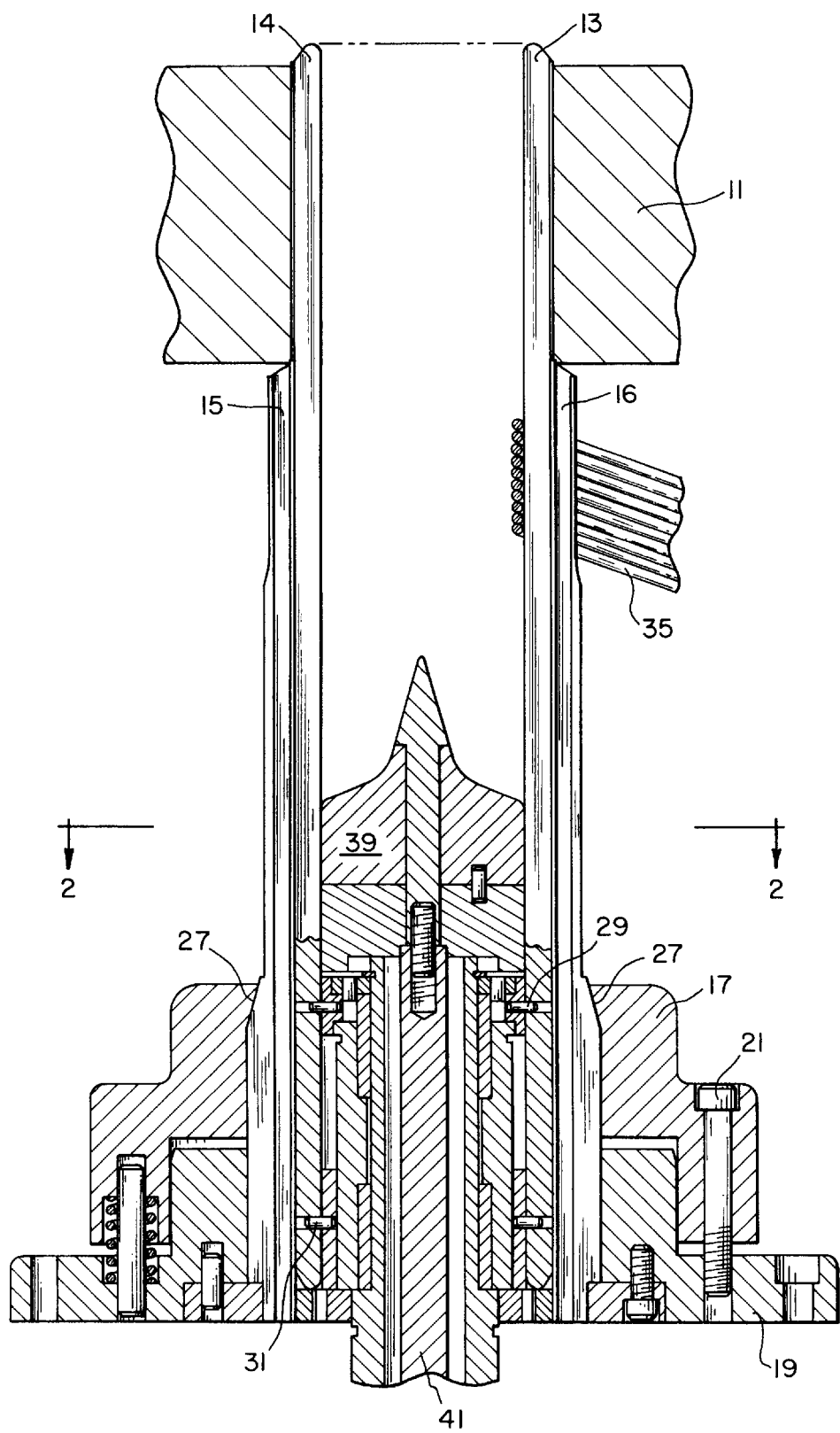
FIG. 1 is a cross-sectional view of the upper tooling portion of coil placing tooling illustrating the present invention in one form.
Figure 2:
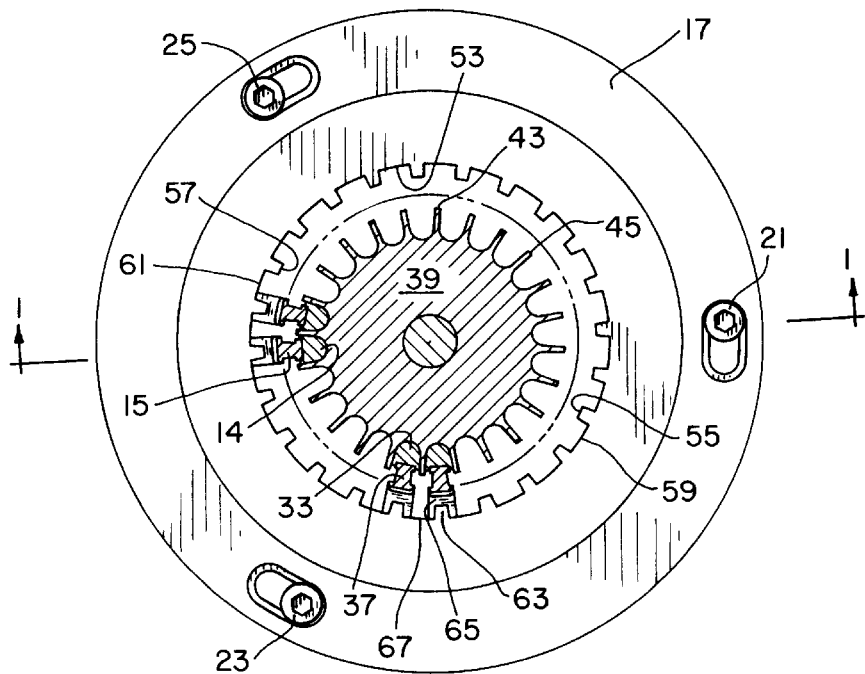
FIG. 2 is a cross-sectional view along lines 2—2 of FIG. 1.
Figure 3:
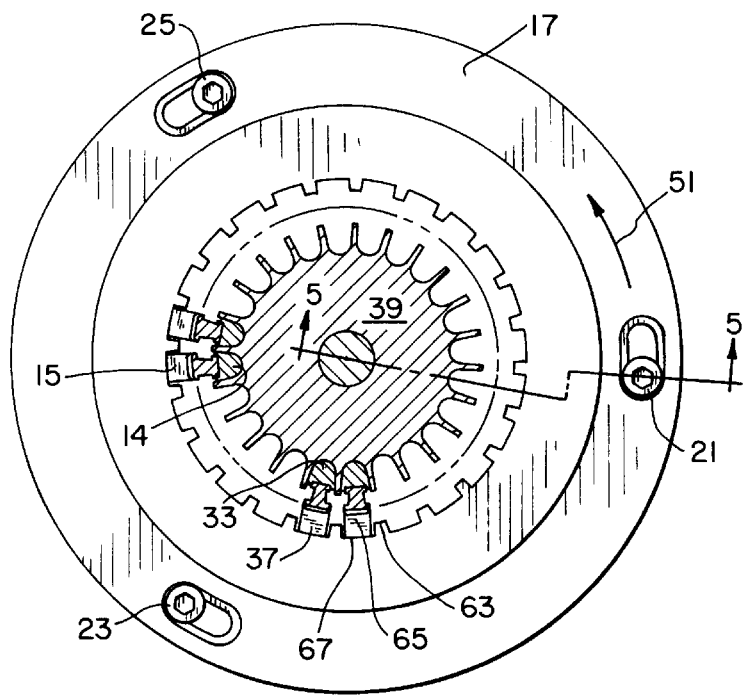
FIG. 3 is a cross-sectional view similar to FIG. 2, but taken along line 3 of FIG. 5.

In FIG. 1, a conventional dynamoelectric machine stator core 11 is illustrated perched on top of a set of blades 13 or 14 which are positioned radially inwardly of a like number of wedge guides 15 or 16. A collet 17 is clamped downwardly to a mounting base 19 by collet clamping screws 21, 23 and 25. The collet 17 engages the wedge guides along surfaces 27 thereby maintaining the wedge guides axially downward and radially inward in position. The wedge guides engage their corresponding blades along a vertical surface and maintain their corresponding blades radially inwardly. The blades are engaged by dowels such as 29 and 31 and locked vertically in position thereby. As best seen in FIGS. 2 and 3, the coil placing tooling has a plurality of these generally parallel upstanding blades such as 14, and 33 which are disposed in a generally cylindrical pattern for receiving prewound coils 35 of FIG. 1 and thereafter a stator core 11. FIGS. 2 and 3 also best illustrate the plurality of generally parallel upstanding wedge guides such as 15 and 37 disposed in a generally cylindrical pattern radially outwardly of their corresponding blades. Adjacent pairs of these wedge guides cooperate to guide wedges between adjacent ones thereof under the urging of wedge push rods (not shown) into corresponding stator core slots. During a later portion of the wedge push rod stroke, the stripper 39 is forced upwardly by rod 41. Certain ones of the radially extending stripper fins such as 43, 45 and 49 engage the coils such as 35 forcing those coils, or, more precisely, the side turn portions of those coils, into the appropriate stator core slots.

Figure 4:
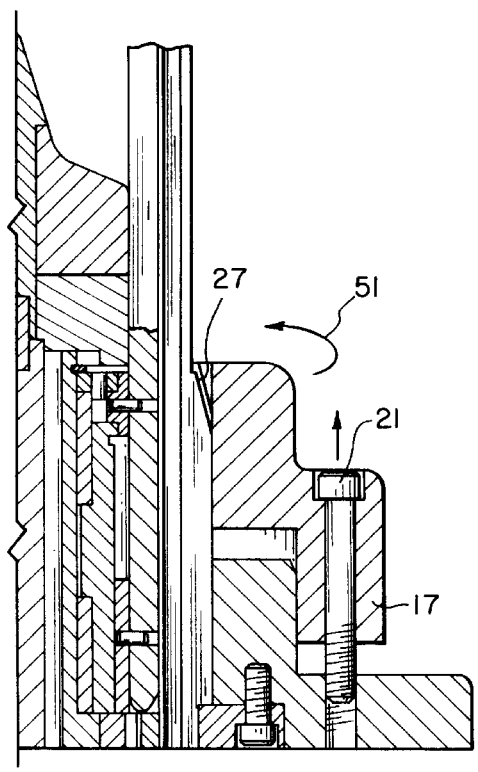
FIGS. 4, 5 and 6 are cross-sectional views of the lower right hand portion of FIG. 1 illustrating the sequential removal of a wedge guide and a blade.
Figure 5:
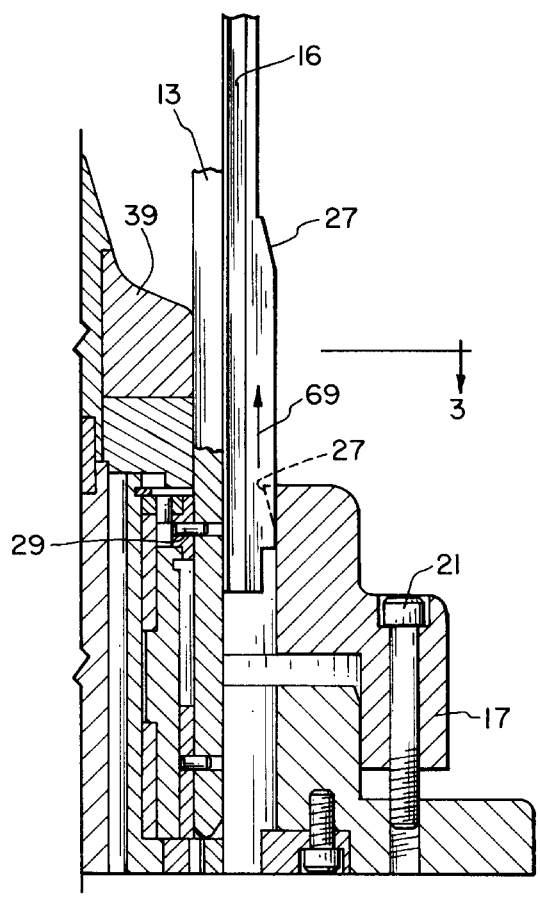
Figure 6:
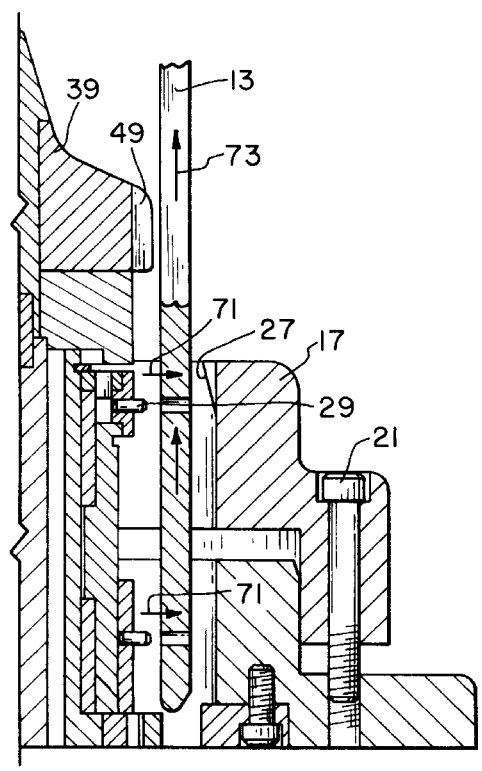

Considering FIGS. 2–6, The annular collet 17 is selectively movable angularly between a first locked position as shown in FIG. 2 where the collet clamping screws 21, 23 and 25 are tightened thereby releasably locking the collet in the first angular position holding the collet and blades securely in place, and a second angular position as seen in FIGS. 3, 5 and 6 where, after the collet clamping screws are loosened, the collet has been rotated angularly counterclockwise as indicated by arrow 51. Comparing FIGS. 2 and 3, it will be noted that the collet 17 has a fluted inner periphery 53 with plurality of lands or ridges 55, 57 and 63 with intervening grooves such as 59 and 61. There are at least as many lands as there are wedge guides and, while not all blades are shown in FIGS. 2 and 3, in the preferred form, there are the same number of lands, wedge guides and blades. As shown in FIGS. 2 and 3, there are n=24 wedge guides, 24 blades, 24 lands, and 24 intervening grooves uniformly spaced about the collet inner periphery. For this example, the angular difference between the first and second positions is 180/n=7½ degrees. The collet aligns a land such as 63 with a wedge guide such as 65 in the first angular position of FIG. 2 and maintains the wedge guide position both axially and radially inwardly by the mating surfaces 27. After rotation, the collet aligns a groove such as 67 with wedge guide 65 thereby freeing the wedge guide when in the second angular position as illustrated in FIG. 3. As best seen in FIGS. 4, 5 and 6, the radially inner land surfaces lie generally in a frustoconical pattern and each wedge guide has a radially outwardly axially inclined surface 27 engaging the respective inner land surfaces, also 27, when the collet is in the first angular position. To remove a blade, the screws 21, 23 and 25 are loosened and the collet rotated as indicated by arrow 51 to the position of FIG. 3. Wedge guide 16 may then be lifted as illustrated by arrow 69. When the wedge guide 16 is completely removed, blade 13 may be moved radially outwardly as illustrated by arrows 71 freeing the blade 13 from dowels such as 29 and allowing blade 13 to be removed upwardly along arrow 73. All of the blades may be made selectively removable according to this technique, or only certain ones as desired.

Figure 7:
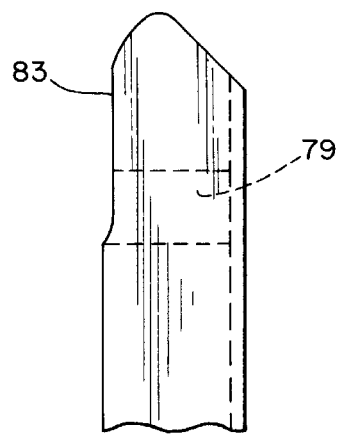
FIG. 7 illustrates an improved blade incorporating the present inventive technique for limiting coil insulation damage during insertion.
Figure 8:
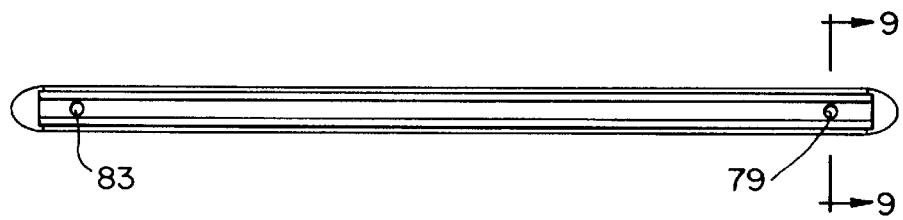
FIG. 8 is a side elevation view of the radially outside side of a prior art blade.
Figure 9:
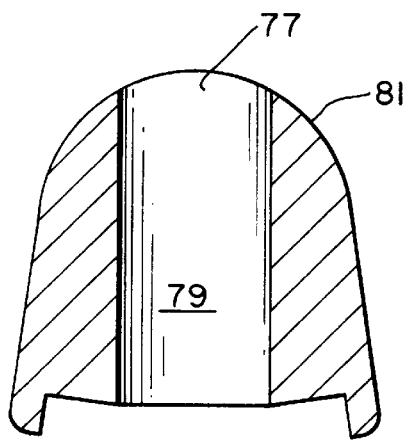
FIG. 9 is a cross-sectional view along line 9—9 of FIGS. 8 and 10.
Figure 10:
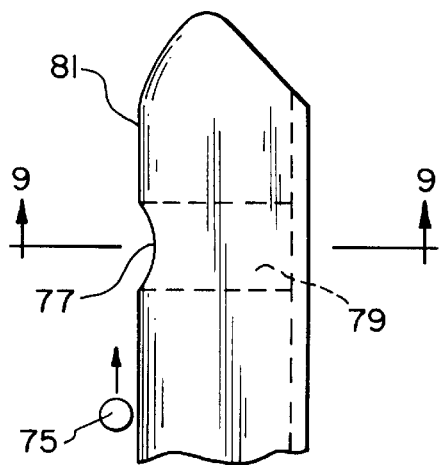
FIG. 10 is a view of one tip end portion of the blade of FIGS. 8 and 9 taken in a direction perpendicular to each of those views.

As noted earlier, certain of the blades may be reversible, having at least one mounting dowel receiving hole near each end. A prior art reversible blade of this type is shown in FIGS. 8, 9 and 10. The blade is elongated having the generally uniform cross-sectional configuration of FIG. 9. The blade has a convex surface portion 81 which faces radially inwardly toward similar convex surfaces on other of the blades when mounted in the coil placing tooling. Transverse support dowel receiving holes 79 and 83 are located near each end. One of these transverse holes is unused while the blade is mounted in the coil placing tooling by a dowel passing through the other of said holes. The blade may be removed from the dowel, reversed end-for-end and replaced in the coil placing tooling with the dowel passing through the previously unused transverse hole in the previously free end. Considering the unused hole 79 of FIG. 10, as the stripper moves upwardly forcing coil end turn portions such as 75 along the blades, that coil portion 75 may scrape along the edge 77 formed where the dowel hole 79 meets the convex surface 81. If the surface 81 were flat or concave, such an edge would not be formed. To eliminate the edge 77, each free end of the blade has the convex portion relieved at 83 from the center of the hole toward the corresponding end of the blade as shown in FIG. 7. Both ends of the blade are relieved in this manner. Comparing FIGS. 7 and 8, the amount of material removed from surface 81 to form surface 83 is about 0.008 to 0.010 inches, thus, the maximum blade thickness in the direction of the respective dowel receiving holes is at least 0.008 inches less between each hole and it corresponding free end than the corresponding maximum blade thickness is between the holes.

The method of operation of the invention to remove selected blades should now be clear. The collet 17 locking screws 21, 23 and 25 are loosened slightly thereby releasing the collet for limited displacement relative to the blades. The collet 17 is moved to a position where selected wedge guide such as 15, 16 and 37 are freed axially and radially. Certain selected ones of the wedge guides are then removed and subsequently corresponding ones of the blades such as 14, 33 and 13 may be removed. The wedge guide must be removed first to provide sufficient clearance for removal of the blade. Typically, the collet is released for and rotated through a limited angular displacement such as 180/n degrees, where n is the number of uniformly distributed wedge guides, to a position where the selected wedge guides are freed axially and radially for ready removal.

In summary, the invention has a number of advantages over known prior devices. Stack height adjustment is maintained despite removal and replacement of wedge guides or blades. There is no need to remove the stripper when removing or replacing such wedge guides or blades. Wire damage during the coil insertion process is reduced.

From the foregoing, it is now apparent that a novel coil placing tooling along with a novel technique of operating such tooling has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. In coil placing tooling having a rigid annular collet having a fluted inner periphery with a plurality of lands and intervening grooves with the lands adapted to be aligned with and engage corresponding wedge guides to thereby maintain said wedge guides and blades axially and radially in position, the method of removing selected ones of said wedge guides comprising releasing the collet for limited angular displacement relative to said wedge guides and blades, rotating the collet to a position where the selected ones of said wedge guides are radially aligned with corresponding intervening grooves and freed axially and radially for ready removal, and removing the freed selected ones of said wedge guides.

2. The method of claim 1 wherein each wedge guide maintains a corresponding blade radially inwardly, a wedge guide being first removed to free a corresponding blade.

3. An improved reversible blade for coil placing tooling, the blade comprising an elongated blade of generally uniform cross-sectional configuration including a convex surface portion and having a transverse support dowel receiving hole near each end thereof, the blade being normally mounted in coil placing tooling along with other similar blades by a dowel passing through one of said holes and with the convex surface portions facing radially inwardly toward one another, the blade adapted to be removed from the dowel, reversed end-for-end and replaced in the coil placing tooling with the dowel passing through the transverse hole in the previously free end, each free end having the convex portion relieved from the center of the hole to the corresponding end of the blade, the dowel receiving holes being generally parallel to one another and the maximum blade thickness in the direction of the respective dowel receiving holes being less in the relieved portion between each hole and its corresponding free end than the corresponding maximum blade thickness is between the holes.

4. The improved reversible blade of claim 3 wherein the maximum blade thickness in the direction of the respective dowel receiving holes is at least 0.008 inches less in the relieved portion between each hole and its corresponding free end than the corresponding maximum blade thickness is between the holes.

* * * * *